Nov. 6, 1956 E. F. PAUL 2,769,698
FUEL MIXER INSERT
Filed May 20, 1952 2 Sheets-Sheet 2
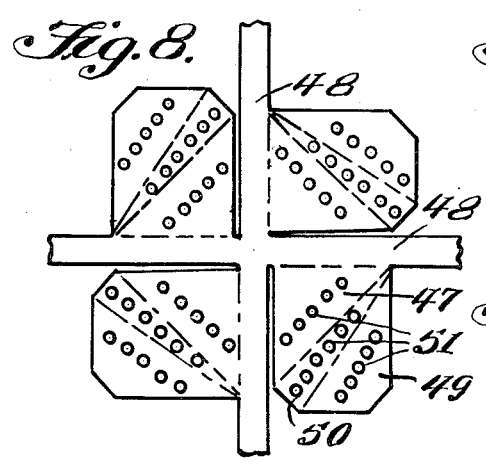
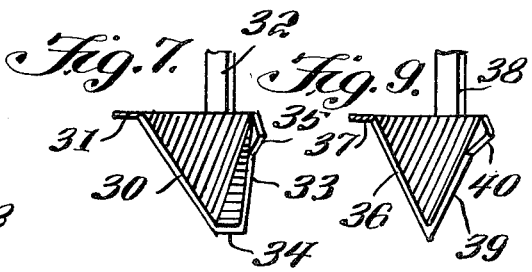
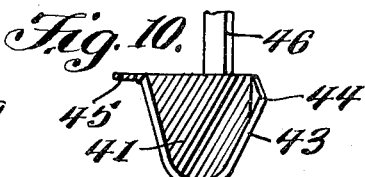
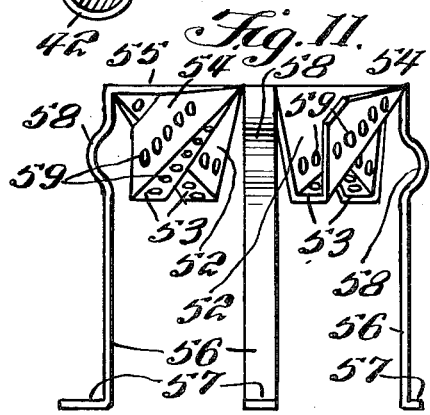
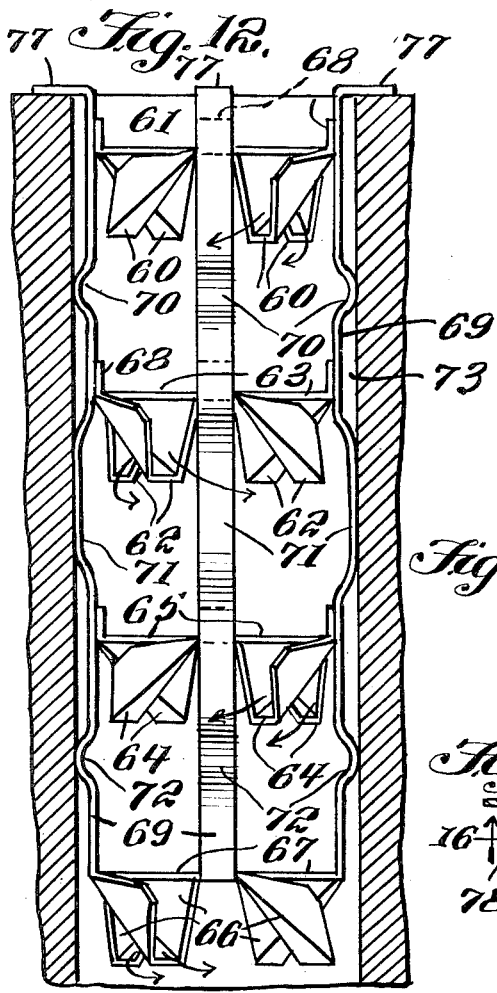
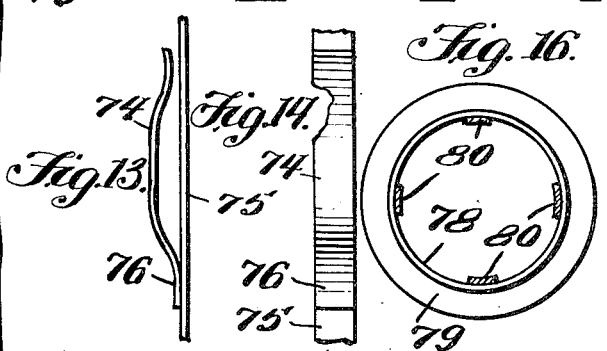
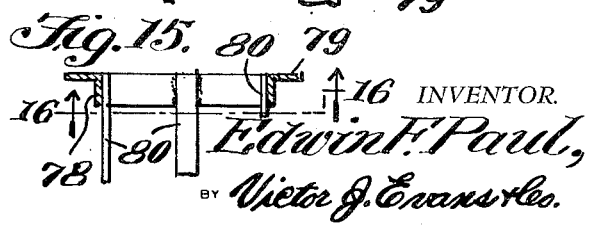
INVENTOR.
Edwin F. Paul,
BY Victor J. Evans & Co.
ATTORNEYS United States Patent Office 2,769,698
Patented Nov. 6, 1956

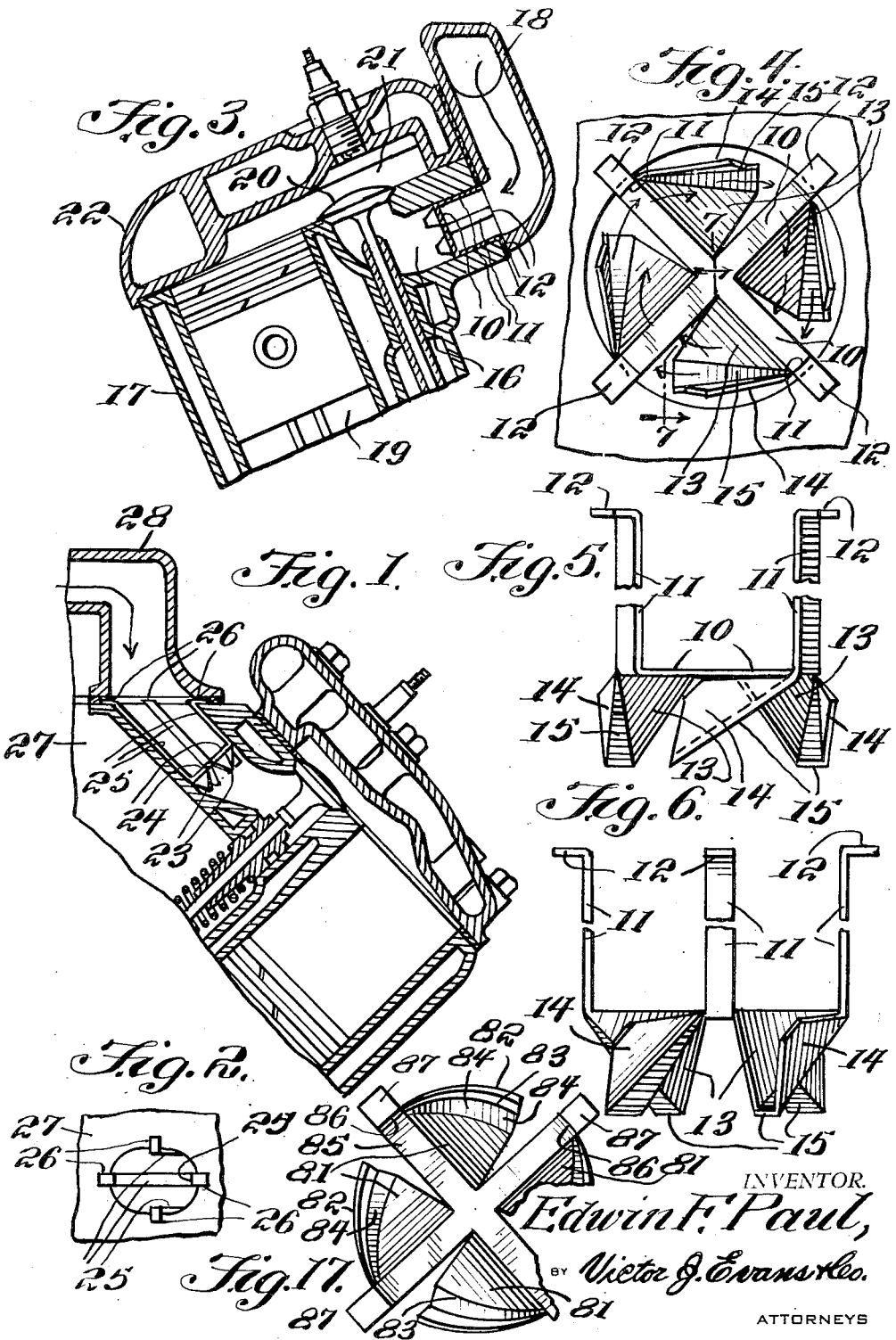

2,769,698

FUEL MIXER INSERT

Edwin F. Paul, Delphos, Kans.

Application May 20, 1952, Serial No. 288,879

3 Claims. (Cl. 48—180)

This invention relates to fuel mixture atomizing devices for fuel passing into cylinders of internal combustion engines, and in particular a plurality of arcuate sectorlike vanes extended from star shaped ribs whereby the vanes are suspended by the ribs in the fuel intake passage in the cylinder block or head of an internal combustion engine whereby turbulence is imparted to the fuel mixture as the mixture passes through the intake valve.

The purpose of this invention is to impart a swirling tempest motion to the fuel mixture as it enters an internal combustion engine whereby the fuel particles are thoroughly mixed with the air with rich and lean parts, cool and warm parts, light and heavy ends contained in suspension by turbulence whereby the possibility of the separation of the fuel particles is substantially eliminated and consequently uneven firing, and uneven power stroke and spark or knock detonation is substantially eliminated.

Various attempts have been made to obtain improved mixing of the fuel of internal combustion engines with air, however, after numerous tests it has been found that for more efficient operation of an internal combustion engine the fuel should be mixed just before it passes through the intake valve in the head of the engine, whereas the conventional types of mixing devices attempt to provide turbulence in combination with the carburetor or before the fuel enters the intake manifold. With this thought in mind this invention contemplates a plurality of arcuate spirally positioned vanes struck from a comparatively thin sheet of material whereby the vanes are adapted to be suspended by the material from which they are struck in the fuel passage in the block or head of an engine whereby turbulence is imparted to the fuel mixture before it reaches the intake valves of the engine.

The object of this invention is, therefore, to provide means whereby the fuel of internal combustion engines is thoroughly mixed just as it passes through the intake valve of the engine.

Another object of the invention is to provide an improved fuel mixture for internal combustion engines that may be installed in fuel passages of the engine without changing parts of the engine.

A further object of the invention is to provide an improved fuel mixing device for internal combustion engines which is of a simple and economical construction.

With these and other objects and advantages in view the invention embodies radially disposed ribs and also ribs with extended arms and a plurality of triangular or sector shaped arcuate veins extended from the ribs and adapted to be suspended by the ribs in the fuel intake passage of the head of an internal combustion engine.

Other features and advantages will appear from the following description taken in connection with the drawings, wherein:

Figure 1 is a vertical section through the outer end of a cylinder of an internal combustion engine illustrating the position of the fuel mixing device in the fuel intake passage of the engine.

Figure 2 is a plan view illustrating the position of the fuel intake device in the passage with the manifold omitted.

Figure 3 is a vertical section similar to that shown in Fig. 1 illustrating the upper part of an engine of a different type and showing a modification of the fuel mixer.

Figure 4 is a plan view of the fuel mixer illustrated in Fig. 3 showing the parts on an enlarged scale.

Figure 5 is a side elevational view of the fuel mixing device shown in Fig. 4.

Figure 6 is also a side elevational view of the fuel mixing device shown in Fig. 4 being taken at an angle of 45° from that shown in Fig. 5.

Figure 7 is a detail showing a view taken on line 7—7 of Fig. 4 illustrating the shape of one of the vanes.

Figure 8 is a plan view of the device shown in Fig. 4 before the section providing the vanes is formed and showing a modification wherein perforations are provided in the vanes.

Figure 9 is a detail similar to that shown in Fig. 7 illustrating a modification wherein vanes of a different shape are used.

Figure 10 is a similar view showing a further modification also illustrating blades of a different shape.

Figure 11 is a side elevational view similar to that shown in Fig. 6 with the parts reversed whereby the device may be placed in a manifold with flanges at the ends of arms thereof secured between the face of the head or block and the manifold and also with the vanes perforated.

Figure 12 is a vertical section through a fuel intake passage illustrating a plurality of alternately positioned mixing devices installed in the passage and illustrating a further modification wherein the ribs of the mixers are mounted on longitudinally disposed strips of material.

Figure 13 is a detail showing a modification wherein spacing springs are provided on the strips of material for urging the device in the center of the fuel passage.

Figure 14 is a side elevational view also showing the spring clips shown in Fig. 13.

Figure 15 shows a further modification wherein the strips of material upon which the mixing devices are carried are mounted with annular rings at the ends.

Figure 16 is a section taken on the line 16—16 of Fig. 15 showing a ring at one end of the device with the strips extended therefrom shown in section.

Figure 17 is a view similar to that shown in Fig. 4 illustrating another modification wherein the vanes are formed with arcuate intermediate sections, and the sections or sectors are provided with flanges at the edges.

Referring now to the drawings wherein like reference characters denote corresponding parts the fuel mixture turbulence imparting device of this invention includes, in the most simple form, a plurality of ribs 10 with arms 11 extended from the ends of the ribs and with flanges 12 on the ends of the arms, and in the form illustrated in Figs. 4, 5, and 6 vanes or blades extend from the edges of the ribs with sections 13 of the blades integral with the ribs and with wings 14 of the blades connected to the sections 13 with troughs 15.

It will be appreciated that this formation of the blades is only typical as the blades are adapted to be formed, particularly as illustrated in Figs. 7, 9 and 10 and also as illustrated in Figs. 8, 11, and 17.

With the blades formed as illustrated in Figs. 4, 5 and 6 the mixing device is inserted in a fuel passage 16 of an engine block 17 and the flanges 12 are positioned between the face of the block and an intake manifold 18. With the mixer in this position the fuel mixture passing into the cylinder 19 of the engine through the intake valve 20 travels over the blades whereby turbulence is imparted to the mixture and the mixture including the fuel and air passes through the intake valve with a swirling action. In this design the fuel passes into a cavity 21 in a head 22 and from the cavity into the cylinder 19.

In the design illustrated in Fig. 1 the fuel mixing blades 23 are carried by ribs 24 at the ends of arms 25, and the arms are held by flanges 26 between the face of the engine block 27 and manifold 28. In this design the ends of the arms 25 with the flanges 26 are formed on an angle in relation to the axis of the mixing device to correspond with the fuel passage of the engine.

It will be understood that the blades or vanes may be formed in suitable shapes, such as the vanes illustrated in Figs. 7, 9, and 10. In Fig. 7 the vanes are formed with inner sections 30 which extend from ribs 31 having arms 32 extended therefrom and wings 33 which are connected to the sections 30 with troughs 34 are provided with lips 35.

In Fig. 9 a triangular shape blade is illustrated wherein the blades are provided with intermediate sections 36 and the sections 36 are carried on ribs 37 from which arms 38 extend, and the opposite sides of the blades 36 are provided with wings 39 the upper edges of which are provided with lips 40.

In Fig. 10 arcuate blades 41 are provided with curved edges as indicated by the numeral 42 and wings 43 on the extended sides are provided with lips 44. The blades 41 are carried by ribs 45 having arms 46 extended therefrom.

In the design illustrated in Fig. 6 a blank is shown wherein blades formed with depending sections 47 extend from the edges of ribs 48 and wings 49 are connected to the sections 47 with triangular shaped sections 50. In this design the blades are provided with perforations as indicated by the numeral 51 and these perforations may be positioned as shown or located at any suitable point or points in the blades.

In the design illustrated in Fig. 11 blades having inner sections 52, troughs 53 and wings 54 extend from ribs 55 which are positioned on the upper ends of supports 56 whereby the blades are positioned between the supports. The supports 56 are provided with flanges 57 and the intermediate parts of the supports are provided with outwardly bulging sections 58. It is preferred to place the sections 58 comparatively close to the ribs 55 so that the mixing blades may be located in the center of a passage in which the device is mounted. The blades shown in Fig. 11 may also be provided with perforations, as indicated by the numeral 59.

With the parts positioned as shown the flanges 57 are secured between the face of the head or block and the manifold.

Figure 12 illustrates an assembly of fuel mixing devices whereby blades 60 extend from ribs 61 in one position, blades 62 are suspended by ribs 63 in another position, blades 64 are suspended by ribs 65 in another position and blades 66 by ribs 67 in still another position.

The mixing devices may, therefore, be used individually or in combination and any suitable number of mixers may be used as may be desired. With the parts arranged as shown in Fig. 12 the blades of the mixer unit may be positioned clockwise, or counter-clockwise, or the blades may be alternated wherein one set of blades is positioned clockwise and the next counter-clockwise.

As illustrated in Fig. 12 the arms upon which the blades are carried are provided with flanges 68 with which the arms are secured to strips 69 and the strips 69 are provided with bulging sections 70, 71 and 72 whereby the mixing devices are spaced from the walls of a fuel passage 73, and consequently, centered in the passage.

The bulging section of the supporting strips 69 may be replaced with spring fingers 74 as shown in Figs. 13 and 14 the fingers 74 being secured to strips 75, similar to the strips 69 at the point 76 and the opposite ends of the spring fingers being free to spring outwardly as illustrated in Fig. 13.

The ends of the strips 69 and 75 may be provided with flanges 77 for supporting the strips in position, or the ends of the strips may be secured to rings 78 having annular flanges 79, as illustrated in Figs. 15 and 16 wherein strips 80 are secured to the ring 78, preferably by welding, although it will be understood that the ends of the strips may be secured by other means.

The blade illustrated in Fig. 17 is substantially the same as that shown in Fig. 4 except that the body of the blade is formed with a sector 81 which is arcuate in cross section and triangular shaped flanges on the extended edges of the blades connect the blades to wings 82 with troughs 83 which are also triangular shaped and which are integral with the wings and triangular shaped sections which are indicated by the numeral 84 and which bend outwardly from the arcuate sections 81 of the blades. In this design the arcuate sections 81 depend from ribs 85 and the ribs 85 are supported with arms 86 having flanges 87 on the ends.

It will be understood, therefore, that the fins or blades may be formed in various shapes and designs and the blades may be supported by arms or strips or other means.

It will also be understood that the device may be used in a cylinder block or head and when the contour of the intake passages in the head or block is very irregular the device, particularly as shown in Fig. 11, may be placed in the manifold. The device as shown in Fig. 11, may have one or more sets of blades or a plurality of such devices may be used together as shown in Fig. 12.

The arms 56 as shown in Fig. 11, or 69 as shown in Fig. 12 may also be curved or otherwise formed to correspond with the shape of the fuel passages.

The device may be used close to the carburetor of an engine when it is difficult to insert it in fuel passages at other points, however, for best results it is desirable to locate the device as close to the intake valves as possible.

It will be understood that other modifications may be made in the design and arrangement of the parts without departing from the spirit of the invention.

What is claimed is:

1. A fuel mixer for use in an inlet passage of the intake of an internal combustion engine comprising radially disposed ribs with arms extended at right angles from extended ends thereof and with flanges extended at right angles from the extended ends of the arms, the ribs and flanges being positioned in spaced parallel planes and vanes substantially triangular shape in elevation and U-shape in cross section extended from edges of the ribs and positioned with one side of each of said vanes secured to one of said ribs providing L-shaped supporting elements, the bottom portions of said vanes being extended at right angles from lower edges of said sides and the opposite sides of the vanes being extended at right angles to extended edges of the bottom portions and positioned in planes spaced from and parallel to the sides secured to the ribs.

2. A fuel mixer for use in an inlet passage of the intake of an internal combustion engine comprising radially disposed ribs with arms extended at right angles from extended ends thereof and with flanges extended at right angles from the extended ends of the arms, the ribs and flanges being positioned in spaced parallel planes and the arms connecting the ribs and flanges having spring fingers on outer surfaces thereof providing resilient means for retaining the mixer in position in use, and vanes substantially triangular shape in elevation and U-shape in cross section extended from edges of the ribs and positioned with one side of each of said vanes secured to one of said ribs, providing L-shaped supporting elements, the bottom portions of said vanes being extended at right angles from lower edges of said sides and the opposite sides of the vanes being extended at right angles to extended edges of the bottom portions and positioned in planes spaced from and parallel to the sides secured to the ribs.

3. In a fuel mixer, the combination which comprises an engine block having a fuel passage therein, a plurality of sets of radially disposed ribs with arms positioned at right angles to the ribs and mounted on ends thereof and with flanges extended at right angles from extended ends of the arms, the ribs and flanges being positioned in spaced parallel planes and the arms having friction retaining elements extended outwardly from outer surfaces thereof for retaining the fuel mixer in said fuel passage, and vanes substantially triangular-shaped in elevation and U-shaped in cross section extended from edges of the ribs and positioned with one side of each of said vanes secured to one of said ribs, the bottom portions of said vanes being extended at right angles from lower edges of said sides and the opposite sides of the vanes being extended at right angles to extend edges of the bottom portions of the vanes and positioned in planes spaced from and parallel to the sides extended from the ribs.

References Cited in the file of this patent

UNITED STATES PATENTS

| | | |
|---|---|---|
| 1,092,279 | Martin et al. | Apr. 7, 1914 |
| 1,703,867 | Bursley | Mar. 5, 1929 |
| 2,140,425 | Hamrock et al. | Dec. 13, 1938 |
| 2,415,668 | Barabino | Feb. 11, 1947 |

FOREIGN PATENTS

| | | |
|---|---|---|
| 697,336 | France | Oct. 27, 1930 |